Sept. 30, 1969   F. C. BADALICH   3,469,910
ROTARY SLIDE TRAY
Filed March 7, 1967   4 Sheets-Sheet 1
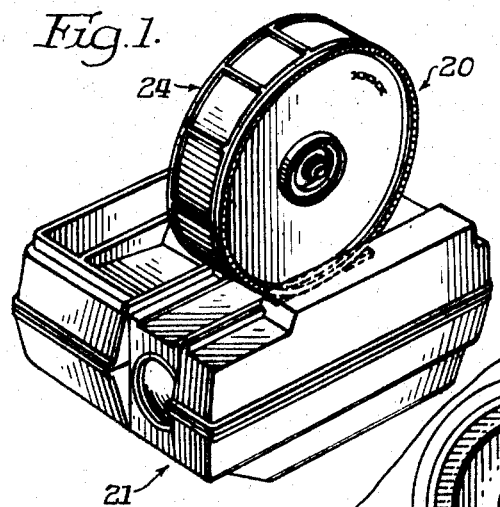
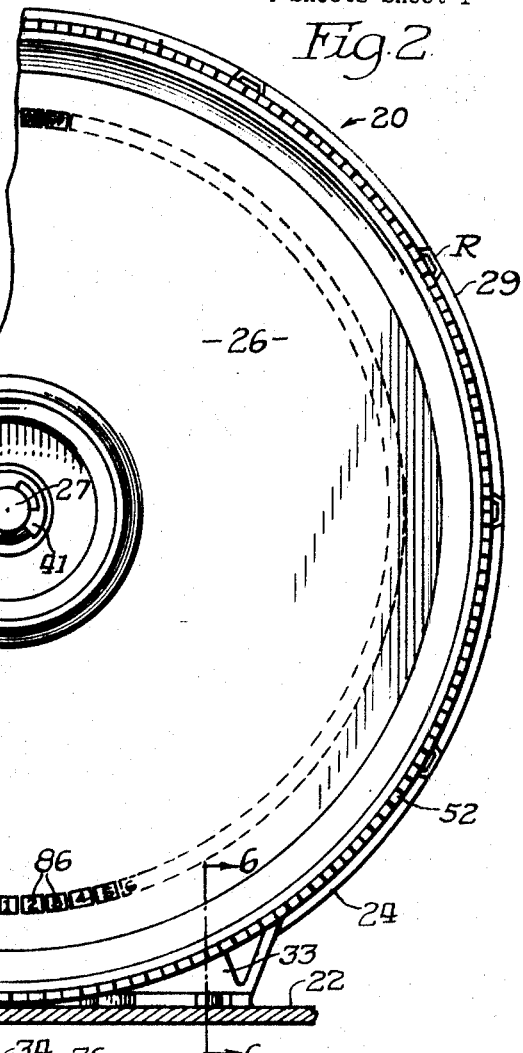
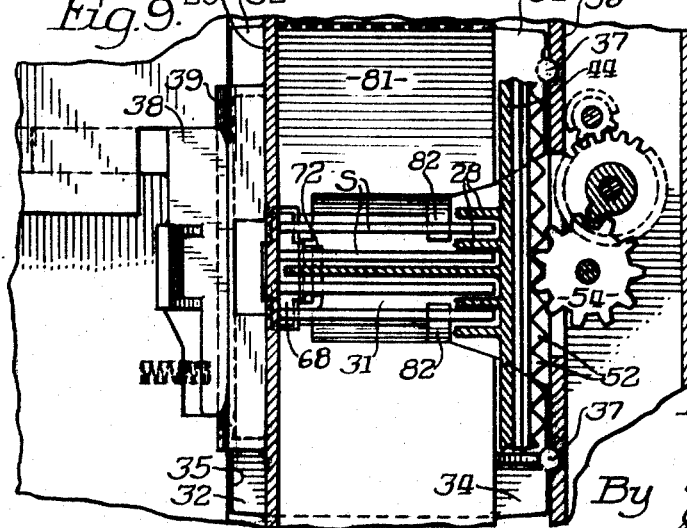
Inventor
Frank C. Badalich
By William F. [Powell]
John E. Peele Jr. Attys Sept. 30, 1969 F. C. BADALICH 3,469,910
ROTARY SLIDE TRAY Filed March 7, 1967 4 Sheets-Sheet 2

INVENTOR.
Frank C. Badalich.
BY
John E. Peek Jr. Attys.

Sept. 30, 1969     F. C. BADALICH     3,469,910
ROTARY SLIDE TRAY
Filed March 7, 1967     4 Sheets-Sheet 3
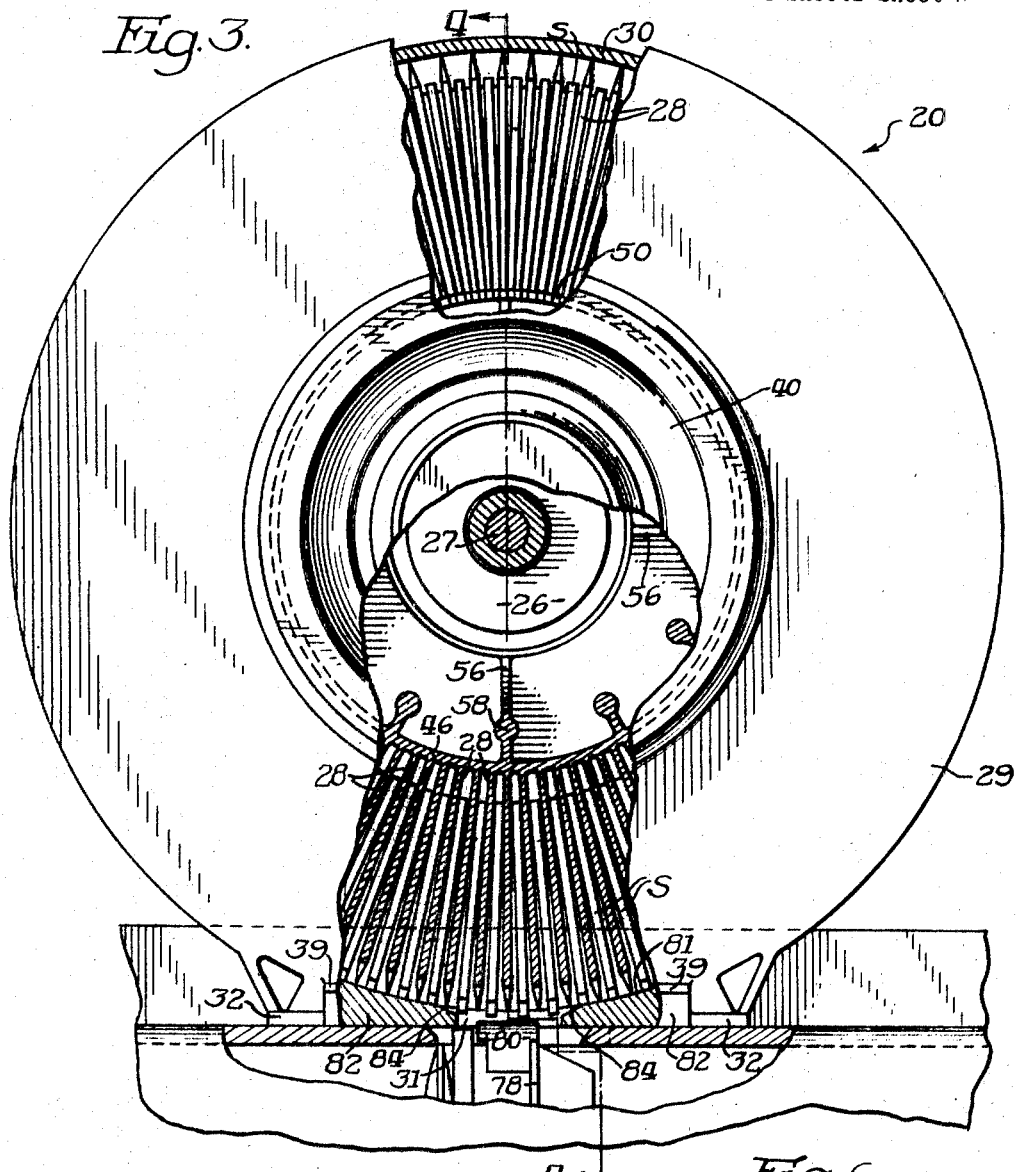
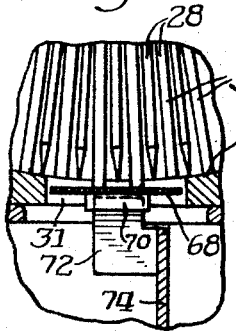
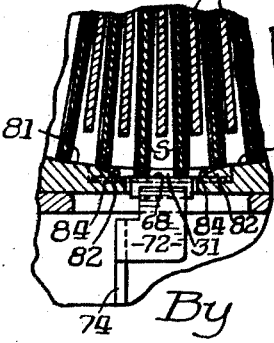
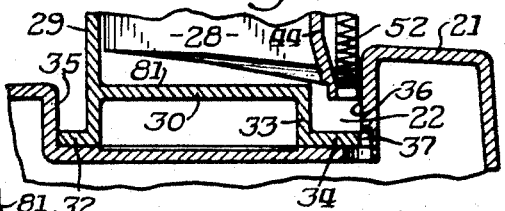
Inventor:
Frank C. Badalich.

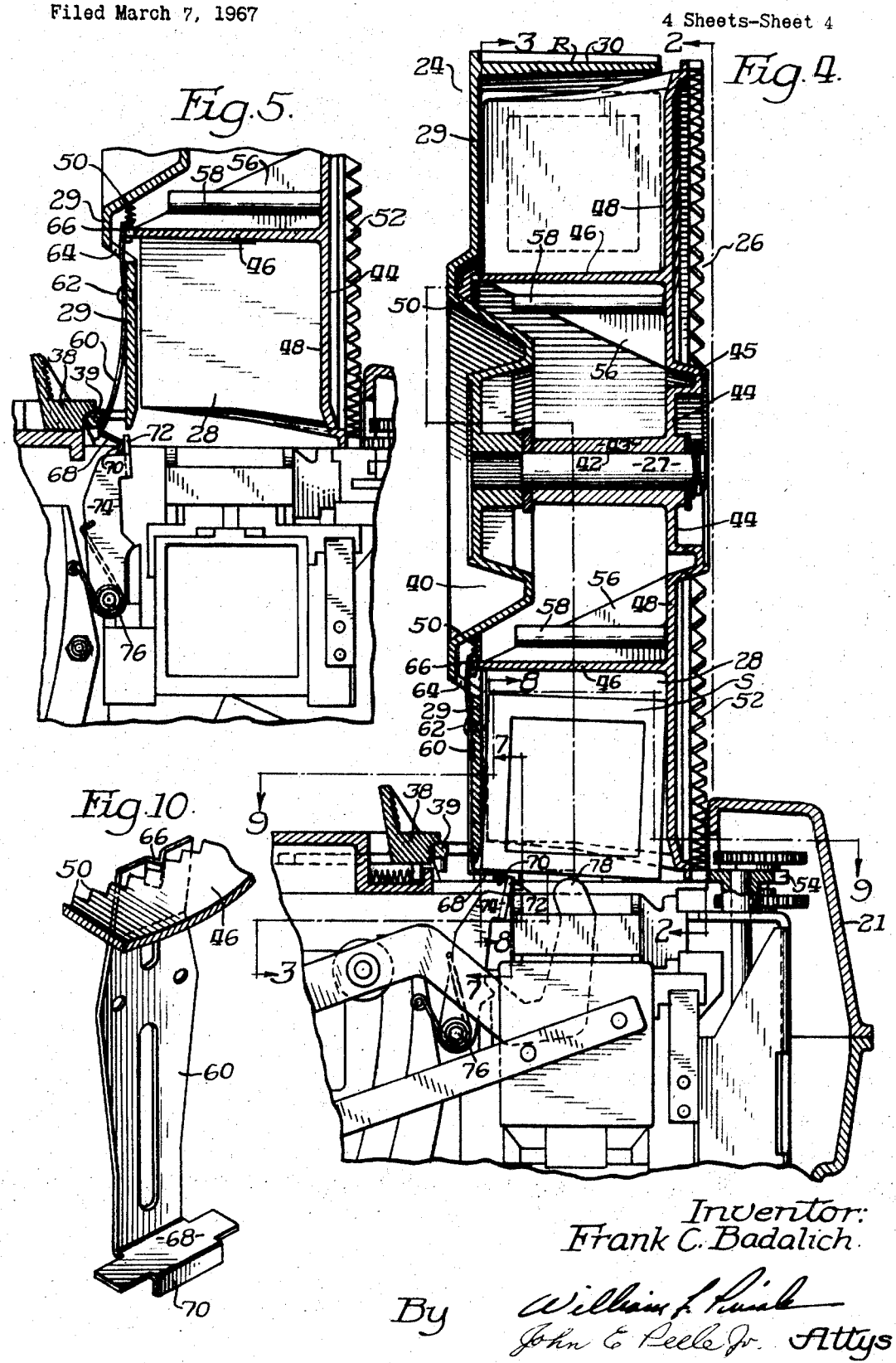

3,469,910
ROTARY SLIDE TRAY
Frank C. Badalich, Chicago, Ill., assignor to Bell & Howell Company, Chicago, Ill., a corporation of Illinois
Filed Mar. 7, 1967, Ser. No. 621,192
Int. Cl. G09f 11/30; G03b 21/00; B65d 1/34
U.S. Cl. 353—117                     16 Claims

ABSTRACT OF THE DISCLOSURE

A rotatable slide tray has means adapted to be actuated by a member on a projector for selectively preventing movement from said tray of slides stored therein.

---

The present invention relates to improvements in slide magazines and more particularly to a new and improved circular slide tray.

In general, it is desirable that rotary slide trays be mounted in a projector so that two primary functions are provided for. The first function is that of enabling movement of the tray so that slides mounted therein are successively presented to the general area of a slide receiving portion of the projector which receives the slides from the tray for the purpose of optical projection. The first function is generally referred to as the "indexing" function. The second primary function consists of accurately aligning the tray with the projector subsequent to the indexing function so that slides in the tray are even more precisely positioned with respect to the slide receiving portion of the projector. This second function is generally referred to as the "final aligning" function, or simply the "aligning" function. The terms "indexing" and "aligning" are used herein in the above sense.

The conventional slide trays now known have provided satisfactory results in certain respects but have proven to be inadequte in other respects.

A primary deficiency in the prior art rotary slide trays has been the failure to provide means for accurately final ly aligning the slide tray with a projector mechanism.

Another drawback of certain prior art rotary slide trays is that they require a considerable amount of force for indexing the tray due to the manner in which they are mounted in the projector.

Another primary problem with the prior art rotary slide trays has been the failure to provide satisfactory means for retaining the slides in the tray when the tray is not in use.

The prior art slide trays have also proven, in many instances, to be both cumbersome and difficult to operate during the loading of the trays.

Another deficiency in the prior art rotary slide trays resides in the fact that they must be stored in a separate container in order to avoid the accumulation of unwanted dust on the slides in the tray.

It is, accordingly, the general object of this inventiton to provide a new and improved rotary slide tray which eliminates the deficiences of the prior art devices.

One manner in which slides have been retained in rotary slide trays in the past has been by the use of frictional means such as springs or clips which frictionally engage the slides within the tray. This expedient has not proven to be entirely satisfactory in that it complicates the slide tray structure and sometimes requires a considerable amount of force for inserting slides into the tray and for removing slides from the tray. When cardboard slides are used the force required for inserting and removing slides from trays of this type has a tendency to weaken and deform the slides so as to make them virtually unusable.

Once the slides are inserted into the frictional grasping trays they are not easily removed for rearrangement or sorting purposes and it is sometimes necessary to rely upon supplementary implements in order to remove a fully inserted slide. This is undesirable since it is both bothersome and tedious.

Many of the prior art rotary slide trays are essentially open structures which allow free access to the slides by dust and other foreign matter so that it is necessary to employ a dust proof container or the like for storage of the trays. The necessity for such containers is troublesome and therefore undesirable.

A variety of indexing means have been employed with rotary slide trays in the past. Many of the conventional prior art rotary slide trays are constructed so that no final aligning function is provided and the sole alignment of the tray with the projector is that provided entirely by the indexing function. A typical manner in which these functions have been combined has been to mount the tray on a driven indexing shaft which is sequentially indexed so as to present slides to the projector. This type of mounting has not proved to be satisfactory since any amount of play of the indexing shaft, such as that caused by wear in the gear train driving the shaft, results in a large amount of play about the periphery of the slide tray. Consequently, the tray is not accurately aligned with the projector. This is particularly undesirable for trays which feed slides radially outwardly from their periphery.

Other conventional rotary slide trays are mounted on a projector so that they engage an indexing gear which performs both the indexing and alignment functions. While this has proven to be fairly satisfactory in some cases, this form of alignment does not always function adequately due to the fact that the drive mechanism for the indexing gear eventually becomes worn and a certain amount of play develops. The indexing teeth on the slide trays also eventually become worn. This is particularly true when the teeth are constructed of plastic or other relatively soft material which wears easily and creates an even greater amount of play or looseness in the final alignment.

Other conventional slide trays have employed a final aligning means which is a part of the projector structure per se and which is cyclically moved into and out of contact with the tray to perform the final aligning function subsequent to the indexing function. This type of alignment means functions adequately but obviously results in a complicated and expensive projector.

Another disadvantage of certain prior art rotary trays arises from the fact that the trays are supported for rotation by means of bearing members in the projector which engage the outer periphery of portions of the tray. This type of construction requires a large amount of force to index the tray due to the fact that it is supported about its periphery and there is no substantial lever arm for conveying indexing force to the support point.

It is, accordingly, an object of this invention to provide an improved rotary slide tray.

A further object of this invention is the provision of an improved rotary slide tray which does not allow the slides to fall out of the tray.

Yet another object of this invention is the provision of a rotary slide tray that does not rely upon indexing means for providing the final alignment of the slide tray.

Still another object of this invention is the provision of a rotary slide tray which allows an easy loading and unloading of slides therein.

A still further object of this inventon is the provision of a rotary slide tray that is easily indexed to different positions.

Another object of this invention is the provision of a rotary slide tray that is essentially dust proof and does not required a removable cover member.

A further object of this invention is the provision of the final aligning means as a part of the tray structure per se.

Yet another object of this invention is the provision of a singular means which performs both functions of retaining slides in the tray and aligning the slides in the tray with the projector.

A still further object of this invention is the provision of a rotary slide tray that is mounted on a central axis for rotation and has indexing means about the outer periphery thereof and aligning means spaced a substantial distance from the axis of rotation so as to provide an accurate indexing and alignment of the tray with a minimum of force.

Another object of this invention is the provision of an improved rotary slide tray that is adapted to be used in a conventional projector which can also use rectangular slide trays.

Still another object of this invention is the provision of a rotary slide tray that will be indexed a greater distance in a projector than a rectangular tray used with the same projector so that slides may be spaced closer together in the rectangular tray.

Another object of this invention is the provision of a rotary slide tray that permits the radial removal of slides from the tray by gravity at desired times but precludes removal of the slides from the tray at all other times.

The aforementioned objects are obtained by this invention by substantially enclosing a drum type rotary slide magazine in a mounting means which, although functioning to retain radially aligned slides in the magazine, also has an access lot which is located so as to permit the removal of a predetermined number of slides from the magazine at any given time. In addition a selectively operable actuator is attached to the mounting means. Unless this actuator is operated it prevents slides from passing through the access slot. When operated, however, the actuator both permits one or more slides to be removed from the magazine and simultaneously aligns the magazine within the mounting means.

The slide tray comprising this invention is intended for use in a conventional projector which also accepts rectangular slide trays. These rectangular slide trays have a rack of involute gear teeth which are adapted to engage with an involute indexing gear on the projector. The indexing gear is cyclically rotated fixed increment so as to incrementally index the rectangular trays a given distance along a feed path.

A rotary slide tray must have its indexing teeth spaced further apart than is necessary on a rectangular tray capable of handling the same thickness of slides. To permit the same indexing gear to drive either rectangular or rotary trays, the rotary slide magazine is provided with a series of sawtooth gear teeth. By providing a sawtooth shape on the tray, it is possible to have a greater pitch between teeth while maintaining contact with the involute indexing gear.

However, the sawtooth shape provides a relatively loose type of gear connection, and accordingly, to provide accurate alignment of the magazine over and above the alignment obtained from the engagement of the sawtooth gear teeth with the involute teeth of the indexing gear, a selectively actuable aligning member is provided.

The rotary slide tray comprising this invention provides many additional advantages over the prior art. The drum magazine is mounted for rotation about a shaft mounted on the mounting shell. In this manner only a small amount of friction is needed to be overcome in order to rotate the drum magazine. In addition, the fact that the indexing teeth are located about the periphery of the drum magazine gives a long lever arm for rotating the drum magazine and also serves to lessen the force required for rotation of the drum magazine. This also provides the further advantage of a greater degree of alignment of the drum magazine by the indexing teeth than its possible where a centrally indexed shaft constitues the sole aligning means. Furthermore, the single actuator which keeps slides from falling from the drum magazine through the slot in the closure plate and also aligns the drum magazine provides a simple, economical and compact structure for performing these two functions. Perhaps equally advantageous is the fact that the actuator is a part of the slide tray structure per se. This permits the use of a less complex projector while retaining the advantage of having a final aligning means.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a perspective view of a preferred embodiment of the invention's rotary slide tray mounted in a conventional projector.

FIG. 2 is a fragmentary front view of the slide tray of this invention with a portion of the supporting projector being viewed in section along line 2—2 of FIG. 4.

FIG. 3 is a rear view of the tray and a portion of the projector taken in partial section along line 3—3 of FIG. 4.

FIG. 4 is an extended sectional view of the slide tray of this invention and the associated projector taken along line 4—4 of FIG. 3 including further details of the projector not shown in FIG. 3.

FIG. 5 is a portion of FIG. 4 illustrating the parts in a different operative position.

FIG. 6 is a sectional view of the slide tray in the associated projector taken along line 6—6 of FIG. 2.

FIG. 7 is a sectional view of a portion of the slide tray and the associated projector taken along line 7—7 of FIG. 4.

FIG. 8 is a sectional view of a portion of the slide tray in the associated projector taken along line 8—8 of FIG. 4.

FIG. 9 is a sectional view of a portion of the slide tray in associated projector taken along line 9—9 of FIG. 4.

FIG. 10 is a perspective view of a slide tray aligning and slide retaining means of this invention.

The rotary slide tray of this invention is intended for use in a conventional type of projector such as is disclosed in copending U.S. application Ser. No. 377,232, filed June 23, 1964, now Patent No. 3,336,836 and which is assigned to the same assignee as this application. In order to avoid burdening this application with subject matter not forming a part of this invention, reference is made to said copending application for details of the projector means per se. The projector is alternatively capable of using rectangular slide trays if desired.

Figure 1A:
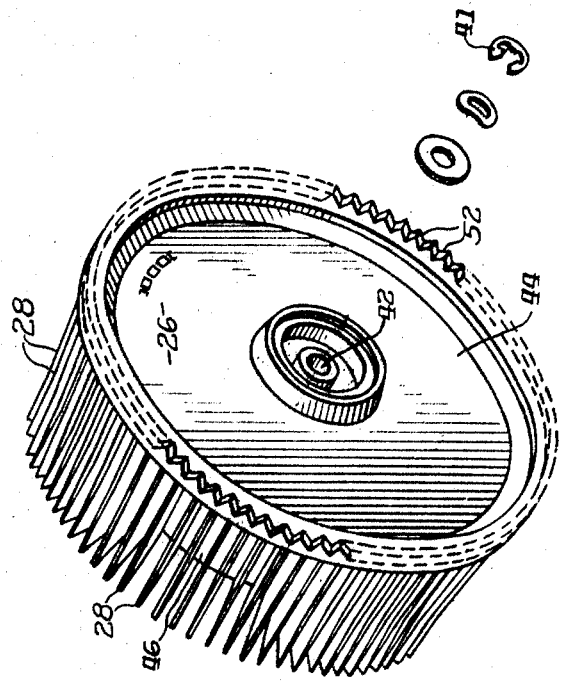
FIG. 1A is a perspective exploded view of a rotary slide tray of this invention.
Figure 1A:
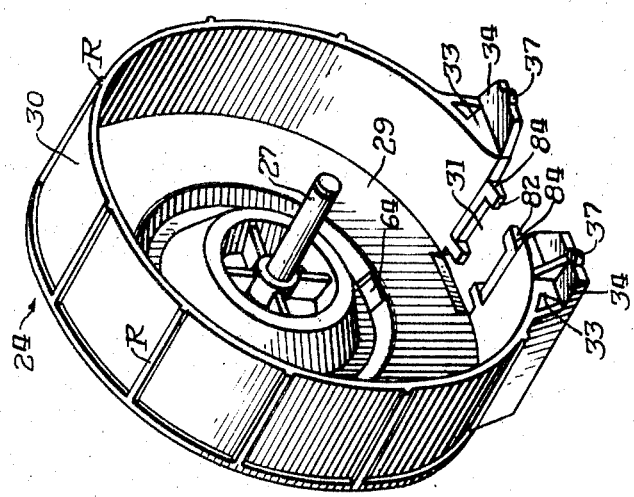

The slide tray of this invention which is generally designated 20 is received in a track 22 of an aforementioned conventional projector 21 as shown in FIG. 1.

The general relationship of the parts of the slide tray to each other is best illustrated in the exploded view of FIG. 1A. The tray comprises two primary elements, a mounting shell 24 and a drum magazine 26, each of which is an integral structure formed of molded plastic or the like. The drum magazine 26 is mounted for indexable rotation about shaft 27 which is fixedly attached to a central portion of a vertical support plate 29 of the mounting shell 24. A plurality of slides S are mounted between radial septum members 28. The slides are mounted on the periphery of the drum magazine and are retained in the drum magazine by a cylindrical closure plate 30 which extends axially from the vertical support plate 29 to enclose the drum magazine. A selectively obstructable access opening slot 31 is provided in closure plate 30 to enable the insertion and removal of slides from the drum magazine at desired times.

The manner in which the slide tray is retained in the projector is best illustrated in FIGS. 6 and 9. Turning first to FIG. 6 it is seen that vertical support plate 29 has a flat horizontal rail 32 extending axially from the lower portion of its outer face while closure plate 30 has a vertical web 33 extending from the lowermost portion of its outer edge. A second horizontal rail 34 extends from the bottom of vertical web 33. Horizontal rails 32 and 34 are both bisected by access opening slot 31 as shown in FIG. 9, and the structure of the rails is symmetrical about said slot. The lower surfaces of rails 32 and 34 rest upon the bottom of track 22 and their edges are retained between sidewalls 35 and 36 of the track as shown in FIG. 6. A pair of lugs 37 on rail 34 (FIG. 9) extend into a pair of recesses in wall 36 to properly position and retain the entire tray structure within the projector. A lightly biased positioner 38 engages a horizontal abutment 39 which is attached to vertical support plate 29 (see FIG. 4 also). When it is desired to remove the tray from the projector, the positioner 38, is moved to the left as illustrated in FIG. 4 and the tray is easily lifted out of the projector.

FIG. 4 illustrates the assembled relationship of the mounting shell 24 and the drum magazine 26. The vertical support plate 29 supports the drum magazine 26 for rotation by means of centrally located shaft 27. A channel 40 is provided in plate 29 to give it added rigidity.

The cylindrical slide retaining closure plate 30 extends from an inner surface of plate 29 as shown in FIG. 4 to substantially enclose the outer periphery of drum magazine 26. Axially aligned bracing ribs R are provided on the outer surface of closure plate 30 for added strength. The primary purpose of the closure plate 30 is to retain slides in the drum magazine as will be discussed hereinafter. An additional feature of the closure plate is that it protects slides in the tray from dust.

The drum magazine 26 is rotatably retained on shaft 27 by means of spring clip mechanism 41. Obviously any suitable retaining means can be employed for this purpose. A cylindrical opening 42 in an elongated hub 43 rotatably fits on shaft 27 to allow rotation of the drum magazine about the shaft.

The drum magazine 26 includes a flange member 44 extending radially outward from one end of hub 43. A circular rib 45 provides additional rigidity for flange 44. A cylindrical shell 46 extends axially from an inner face 48 of flange 44 as shown in FIG. 4. The rearward axial extent of cylindrical shell 46 is defined by a first circular series of sawtooth aligning teeth 50, which serve a purpose to be described hereinafter.

The septum members 28 extend radially outward with respect to the axis of the drum magazine from the outer surface of cylindrical shell 46 (FIG. 3). The septum members 28 also extend parallel to the drum magazine axis from the inner face 48 of flange 44. The outer edge of each septum member 28 is tapered to enable easy insertion of slides into the drum magazine as shown in FIG. 3. Septum members 28 extend radially, as noted above, and consequently are spaced apart a distance that varies directly with the distance from the axis of the drum magazine as shown in FIG. 3. The closest spacing between the septum members is at the point where the septum members join shell 46. This closest spacing is sufficiently wide to allow a slide S to easily fit between the septum members with a slight clearance and is approximately the same spacing employed between the spetum members of a rectangular slide tray which may also be used with projector 21.

The outer periphery of flange 44 has a second series of indexing gear teeth 52 which are of sawtooth configuration and extend axially outward as illustrated in FIGS. 2 and 4. This second series of gear teeth serves the purpose of indexing the drum magazine and as shown in FIGS. 4 and 9 is engaged for this purpose by involute teeth of indexing gear 54 of the projector.

Radial bracing webs 56 provide additional strength for the drum magazine and are located within the cylindrical shell 46 and are integrally attached to flange 44 and the inner surface of shell 46. A thickened portion 58 on each of webs 56 provides additional rigidity.

As shown in FIGS. 4 and 5 a flexible elongated spring plate member 60 is attached to support plate 29 by means of a suitable connecting member 62. Spring plate member 60 extends through an opening 64 in support plate 29 and has an aligning member 66 on the upper end thereof engaging the aligning teeth 50 as shown in FIGS. 10 and 4. The lower end of elongated spring plate member 60 normally has a slide retaining or blocking plate 68 extended outwardly into slot 31 to prevent movement of slides through the slot. The slide retaining or blocking plate 68 has a vertical abutment member 70 extending from its outer end which, when the slide tray is mounted in the projector, is located so as to be cyclically engaged, as in FIG. 5, by an extension 72 on a pivot lever 74 which cyclically pivots about pin 76 of the projector.

The means for cyclically driving the pivot lever, the indexing gear and other moving parts of the projector which are operatively associated with the slide tray are fully disclosed in the aforementioned copending application. When pivot lever 74 is in the position shown in FIG. 4 the slide retaining or blocking plate 68 extends inwardly in access opening slot 31. However, during a portion of the projector cycle the pivot lever 74 is pivoted to the position shown in FIG. 5 wherein the lever 74 engages the elongated spring plate member and moves it so that the slide retaining or blocking plate 68 is moved to the position illustrated in FIG. 5 and the plate no longer blocks access opening slot 31. Accordingly, it is obvious that slide retaining or blocking plate 68 is movable to first and second positions with the first position being that illustrated in FIGS. 4, 7 and 8 wherein the slide retaining plate serves to block access opening slot 31 and retain slides S in the drum magazine. In the second position shown in FIG. 5 the slide retaining or blocking plate 68 is completely removed from access opening slot 31 and slides may be freely fed through access opening slot 31 into or out of the drum magazine 26.

Slide tray 20 is illustrated as being associated with a projector wherein two slides are lowered from the tray during each cycle of operation by means of a pivoted lifter arm 78 which has a slide supporting extension 80 (FIG. 3) extending from one end thereof. The slide support extension 80 extends beneath access opening slot 31 to receive and support two slides which descend by gravity onto same when plate 68 is moved to the position illustrated in FIG. 5. Both slides are then simultaneously lowered into the projector by extension 80. One of the slides is moved to a previewing position and is projected on a previewing screen, not shown, that forms a part of the projector. Simultaneously, the other slide is projected onto a separate screen or the like. The portions of the projector illustrated in FIG. 6 for handling the slides form no part of this invention and are described solely in order to better illustrate the manner in which the slide tray functions. Hence, they will not be discussed further.

The inner surface 81 of cylindrical closure plate 30 (FIG. 6) provides support for the slides on either side of slot 31 as further shown in FIGS. 3, 7 and 8. Turning now to FIG. 9, it will be further seen that plural slide supporting ribs 82 extend inwardly toward each other from opposite sides of slot 31. As shown in FIGS. 3 and 7 the top surfaces 84 of ribs 82 taper downwardly toward the center of slot 31. The tapered surfaces 84 enable a smooth movement of slides from surface 81 onto the slide retaining plate 68 when the drum magazine is rotated. In the reverse direction, to be described more fully later, the tapered surfaces 84 also enable a simultaneous smooth movement of slides from plate 68 onto surface 81. It should be noted that ends of ribs 82 are spaced apart such a distance as to allow the passage of only two slides at a time therebetween.

At the beginning of a cycle of operation the elements are in the positions shown in FIG. 4 and the extension 80 (FIG. 3) of lifter arm 78 is in close proximity to slot 31 and two slides are resting on slide retaining plate 68 (FIG. 7).

The first step in the cycle of operation is the counter-clockwise pivotal movement of pivot lever 74 from the position shown in FIG. 4 to the position illustrated in FIG. 5. This movement of pivot lever 74 causes slide retaining or blocking plate 68 to move from beneath slot 31 so that the two slides resting on plate 68 move downwardly under the force of gravity to rest on slide support extension 80 of lifter arm 78. During this operation, positioning member 66 is engaging teeth 50 to accurately retain drum magazine 26 in an aligned position with the slot 31. The fact that the involute teeth of gear 54 and the sawtooth gear teeth 52 necessarily engage each other rather loosely necessitates the use of positioning member 66 which is biased into sawtooth aligning teeth 50 to obtain accurate final alignment of the drum magazine. The use of sawtooth indexing teeth 52 meshing with the involute teeth of indexing gear 54 results in an indexing movement of the rotary tray (for a given amount of rotation of the indexing gear) that is greater than the indexing movement of a rectangular tray having a rack of involute teeth meshing with the indexing gear.

During the second step in the cycle of operation, pivot lever 74 remains in the position shown in FIG. 5 and lifter arm 78 is pivoted downwardly in a clockwise direction so that the slides resting on extension 80 move into the projector to enable each slide to be projected in the aforementioned manner.

At the termination of the projection of the two slides lifter arm 78 is pivoted counterclockwise to a position slightly higher than the position illustrated in FIG. 4 to lift the two slides into drum magazine 26.

The pivot lever 74 and slide retaining plate 68 then return to the positions illustrated in FIG. 4 and lifter arm 78 is lowered slightly to the position shown in FIG. 4 so that the two slides supported on the extension 80 are deposited to rest upon slide retaining plate 68.

The indexing gear 54 is then rotated a fixed amount and indexes the drum a distance substantially equal to the outermost spacing of two adjacent slides of the drum magazine so that a new slide moves down onto plate 68.

During indexing movement of the drum magazine the aligning means 66 detentably moves into and out of engagement with the aligning teeth 50. It should be noted that movement of the magazine caused by the indexing gear can result in the drum stopping in a position where the aligning member engages one of the sides of the sawtooth teeth 50. However, since the driving connection between the sawtooth teeth 52 and the indexing gear 54 is fairly loose, the pressure of aligning member 66 against one of the sawtooth teeth 50 gives the drum a further rotation to stop at an aligned position with respect to slot 31.

The slide that was projected by the preview mechanism is moved during the indexing of drum 26 but comes to rest on slide retaining plate 68 in the adjacent position that was occupied by the other slide prior to the beginning of the cycle; however, the slide that was projected by the main projection means onto a screen or the like rides up one of the surfaces 84 to a position within the confines of closure plate 30.

To summarize a given slide's course of being projected onto a screen; each slide, along with its preceding slide, is first selectively dropped out of the drum and onto the projector body. The preceding slide is then projected while the particular slide is merely viewable in the projector's preview mechanism. Both of these slides are next returned to the drum magazine which is then indexed and aligned into its next sequential slide position so that the preceding slide is no longer over the lifter arm's extension 80. This is followed by the given slide and its succeeding slide being lowered into the projector. This time, however, the particular slide's image is projected while its succeeding slide is being previewed. Finally both the given slide and the succeeding slide are returned to the drum magazine, whereupon subsequent similar operations are carried out in connection with the succeeding and other slides.

When it is desired to use a slide tray means of this invention in a slide projector not having a previewing means, the ends of ribs 82 are spaced apart a smaller distance to permit only one slide at a time to be removed from the slide tray.

When the slide tray is removed from the projector there is no possibility of slides falling out of the projector since slide retaining or blocking plate 68 extends into access opening slot 31. If it is desired to remove slides from the tray, all that is necessary is that the drum magazine 26 be manually rotated to align the desired slide with slot 31 and plate 68 manually deflected to clear slot 31 to allow the selected slides to fall from the drum through slot 31. Indicating indicia 86 provides a ready indication of the particular slides that are aligned with slots 31.

The insertion of slides into the tray is accomplished by inverting the tray so that the slot 31 is on top, manually moving plate 68 from over slot 31, and then dropping the slides through slot 31 into the drum magazine. The extension 70 provides an easy means for manually moving plate 68.

From the foregoing description it is obvious that this invention provides an improved, convenient and easy-to-use rotary slide magazine that is accurately indexed and aligned in a projector without sacrificing the slide storing capacity of rectangular slide trays which may also be used with the projector.

Obviously, many modifications and variations of the present invention are possible in the light of the above teachings. For example, a means can be provided to selectively retain plate 68 in a position to keep slot 31 open so as to facilitate easier loading and unloading of the drum magazine. It is therefore to be understood, that within the scope of the appended claims, the invention may be practiced otherwise than as specifically described.

The embodiments of the invention in which an exclusive property or privilege is claimed are defined as follows:

1. A rotary slide tray comprising:
   a fixed member adapted to be mounted in a slide projector;
   said fixed member having an access opening for removal of slides;
   a rotatable slide storing member mounted for cooperation with said fixed member;
   means on said tray mounted for movement between a position overlying said access opening and a position uncovering said access opening; and
   an additional means for moving said means.

2. A rotary slide tray as in claim 1 wherein the last named means comprises a flexible member mounted on said fixed member and arranged to overlie the access opening in said fixed member.

3. A rotary slide tray as in claim 1 including means partially on said fixed member and partially on said rotatable member for aligning said rotatable member with said access opening.

4. A rotary slide tray as in claim 3 wherein the aligning means comprises a series of aligning teeth on said rotatable slide storing member and a flexible detent member mounted to said fixed member.

5. The rotary slide tray of claim 3 wherein said aligning means comprises:
  means mounted on said fixed member for movement to a position partially overlying said access opening for blocking movement of slides therethrough; and
  means normally retaining said blocking means in said position for all aspects of said rotatable slide storing member with respect to said fixed member.

6. A rotary slide tray as in claim 1
  wherein the access opening in said fixed member permits movement of a slide through said opening into said slide storing member and also permits movement through said opening of a slide from said slide storing member; and
  selectively operable blocking means normally biased into a position in said access opening to prevent passage of slides through said access opening.

7. A rotary slide tray as in claim 6:
  wherein the blocking means is operative for all positions of the slide storing member relative to the fixed member to move into a position obstructing said access opening so that slides cannot pass therethrough; and
  biasing means normally biasing said blocking means into said position so that said slide tray can be manually manipulated without slides within said slide storing member falling from said storing member through said opening.

8. A rotary slide adapted for use in a slide projector having slide receiving means and an indexing gear for engaging a rack of involute gear teeth of the type generally used on a rectangular slide tray to move such a rectangular tray an incremental distance into slide delivery association with said slide receiving means, said rotary slide tray comprising:
  a circular series of sawtooth gear teeth about the outer periphery of said rotary slide tray for engagement with said indexing gear when said rotary slide tray is mounted in said projector so that a given angular displacement of said indexing gear provides a general alignment of said tray with said slide receiving means, whereby said given angular displacement of said indexing gear moves the periphery of said slide tray through an arc of greater length than the linear distance that the same amount of angular displacement of said indexing gear would move a rectangular tray mounted in said projector; and
  means for providing an accurate final alignment of said drum magazine with respect to said slide receiving means and being mounted entirely on said rotary tray.

9. A rotary slide tray as in claim 8:
  wherein said tray comprises a shell member adapted for mounting on said projector;
  a drum magazine rotatably mounted with respect to said shell member and said projector; and
  means for radially receiving and holding slides about the periphery of said drum magazine.

10. The device of claim 9 wherein said last recited means comprises flexible means for biasing an aligning member into engagement with a second circular series of gear teeth on said drum magazine.

11. A slide tray comprising:
  mounting means removably receivable in a slide projector;
  a cylindrical drum magazine rotatably mounted on said mounting means and having means for radially receiving slides about the periphery of said cylindrical drum magazine;
  said mounting means including closure means for retaining slides in said drum magazine with said closure means having a slot for permitting the radial removal of at least one slide from said drum magazine; and
  selectively actuatable means attached to said mounting means for normally preventing the removal of a slide through said slot but which when actuated permits the removal of at least one slide from said drum magazine and simultaneously aligns said drum magazine with said mounting means.

12. The device of claim 11 wherein said drum magazine includes:
  a first series of aligning teeth spaced a substantial distance from and concentrically about the axis of rotation of said drum magazine, which first series of aligning teeth are engagable by a portion of said selectively actuable means for aligning said drum magazine with respect to said mounting means; and
  a second series of teeth spaced a substantial distance from and concentrically about the axis of rotation of said drum magazine for actuation by means on a slide projector for rotatably indexing said drum magazine on said mounting means.

13. The device of claim 12 wherein said selectively actuable means comprises:
  an elongated member mounted on said mounting means and having an aligning member on one end of said elongated member mounted to engage said first series of teeth to accurately position said drum magazine; and
  a slide retaining plate extending from the other end of said elongated member in a first position to overlie a portion of said slot to prevent movement of a slide therethrough and being movable to a second position spaced from said slot to permit movement of a slide through said slot.

14. The device of claim 13 wherein said mounting means includes:
  a mounting shell having a substantially circular support plate with said drum magazine being mounted for rotation adjacent one side of said support plate; and
  said closure means comprises a substantially cylindrical closure plate extending peripherally from said one side of said support plate so as to enclose the outer periphery of said drum magazine.

15. The device of claim 14 wherein said means for radially receiving slides in said drum magazine includes a plurality of radial septums located about the periphery of said drum magazine for retaining a slide between adjacent septums, whereby rotation of said drum magazine presents a selected slide adjacent to said slot.

16. The device of claim 15 wherein:
  said drum magazine rotates about a horizontal axis;
  said slot in said retaining means is located beneath said axis so as to facilitate removal of a slide from said drum magazine through said slot by gravity; and
  said selectively actuable means comprises;
  an elongated spring plate member mounted intermediate its ends on said support plate; and
  said first series of teeth are fashioned to permit said drum magazine to be detentably rotated to successive aligned positions and to accurately position said drum magazine with respect to said mounting means.

References Cited

UNITED STATES PATENTS

| | | | |
|---|---|---|---|
| 3,276,156 | 10/1966 | Robinson | 40—79 |
| 3,160,972 | 12/1964 | Hall | 40—79 |
| 3,386,195 | 6/1968 | Pester et al. | 40—79 |

EUGENE R. CAPOZIO, Primary Examiner

RICHARD CARTER, Assistant Examiner

U.S. Cl. X.R.

206—73